United States Patent [19]

El-Sayed

[11] Patent Number: 5,676,801

[45] Date of Patent: Oct. 14, 1997

[54] RADIAL INFLOW COMPRESSOR FOR LARGE VOLUMETRIC FLOWS

[76] Inventor: Yehia El-Sayed, 41658 Higgins Way, Fremont, Calif. 94539-4613

[21] Appl. No.: 384,131

[22] Filed: Feb. 6, 1995

[51] Int. Cl.⁶ .................................................. B01D 3/14
[52] U.S. Cl. ................. 202/182; 202/185.1; 202/185.2; 202/185.4; 203/7; 203/10; 203/11; 203/12; 203/DIG. 16; 203/DIG. 17; 415/185; 415/203
[58] Field of Search ........................ 203/7, 10, 11, 203/12, DIG. 16, DIG. 17; 202/182, 185.1, 185.2, 185.4; 415/185, 203

[56] References Cited

U.S. PATENT DOCUMENTS

| | | | |
|---|---|---|---|
| 3,956,072 | 5/1976 | Huse | 202/177 |
| 4,260,461 | 4/1981 | Pottharst, Jr. | 203/7 |
| 4,440,601 | 4/1984 | Katz et al. | 203/24 |
| 4,809,521 | 3/1989 | Mokadam | 62/498 |
| 5,366,514 | 11/1994 | Becnel, Jr. et al. | 23/303 |

*Primary Examiner*—Nina Bhat
*Attorney, Agent, or Firm*—James P. Hillman

[57] ABSTRACT

A radial-inflow large volume-rate low pressure-differential, single-stage compressor comprising 2 periphiral concentric sets of axial blades spaced circumferentially between two supporting rings and further strengthened against bending by intermediate rings if necessary. The outer set of blades rotates to impart energy to the working fluid and the inner set is stationary to recover kinetic energy. Stationary guide surfaces concentric with the blades direct the radially inward flow to axial. A diverging duct recovers further the kinetic energy. The compressor fills the pressure-ratio gap between blowers and turbo-compressors. Its use in desalination instead of the currently used centrifugal compressors, can scale-up the vapor-compression unit-size to more than three fold.

6 Claims, 5 Drawing Sheets

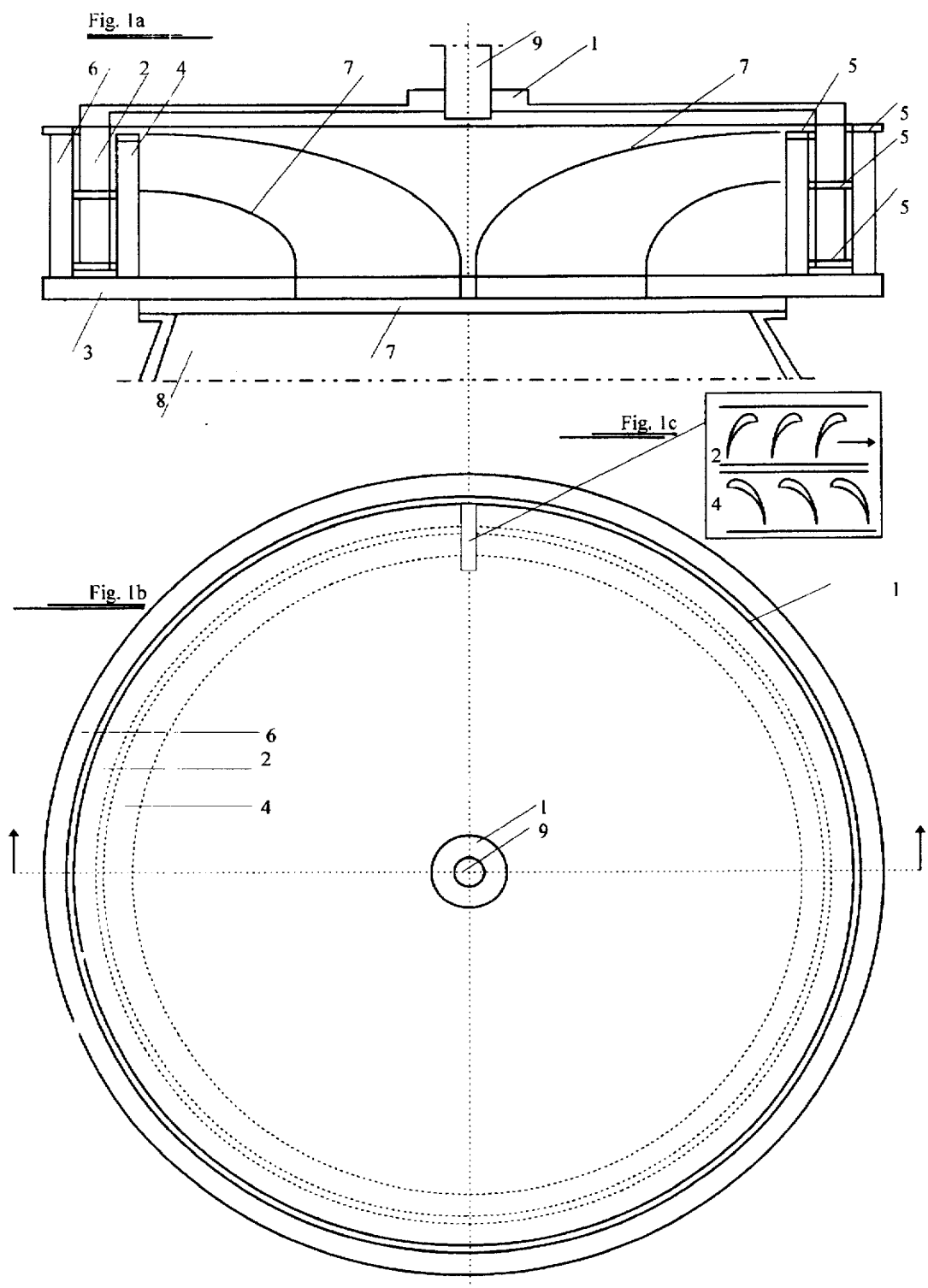

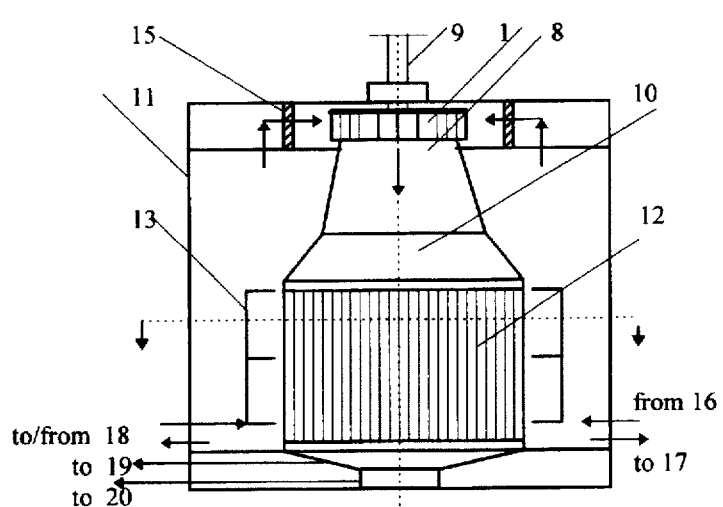
Fig 2a
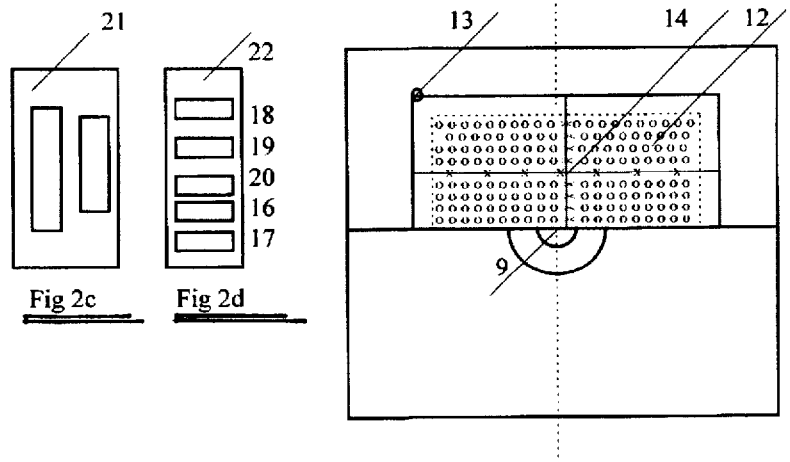
Fig 2c   Fig 2d
Fig 2b $F_c = (mr + mb)/2 * \omega^2 * r_g$
$A = 2*(r_2-r_1)* t * f$
$\sigma_t = Fc/A$ $F_c = r_b*(L*C*b/2)\omega^2*(r_2+r_1)/2$
$F_b = F_c \sin(s) L/24$
$Z = b^2 C/24$
$\sigma_b = M/Z$

RADIAL INFLOW COMPRESSOR FOR LARGE VOLUMETRIC FLOWS

BACKGROUND OF THE INVENTION a) Field of the Invention

The present invention relates to compressors characterized by large volumetric-flow, low pressure-differentials, and high efficiency. The invention fills the pressure-ratio gap between blowers and turbo-compressors. More specially it relates to vapor-compression distillation systems of sea and brackish waters seeking large unit-capacities.

b) Description of the Prior Art

Prior art as a process is reflected under distillation (U.S. Pat. Nos. 3,956,072, 4,260,461, 4,440,601, 4,671,856, 5,366,514), and under heat pumps (U.S. Pat. Nos. 4,345,971, 4,461,675, 4,809,521). As a design, it is under rotary expandable chamber devices (U.S. Pat. Nos. 4,490,102, 4,487,561, 4,597,724, 5,044,887, 5,249,931 presenting various types from positive displacement compressors to turbocompressors). Irrespective of the required pressure ratio, addressing volume rates higher than 5000 cfs (cubic foot per second) by single units, would probably exclude all compressors in common use today from consideration except those of the gas turbines. For example, the axial compressor of a large land-based 100 MW (megawatt) gas turbine handles 12000 cfs. Addressing volume rates of 30000 cfs and higher in the pressure ratio range of 1.1 to 1.5 (still higher than those of fans and blowers), a different design concept is in order.

SUMMARY OF THE INVENTION

A main objective of the invention is a low differential-pressure compressor of inherent features which are suitable to handle large vapor volume rates (30000 to 60000 cfs) with high energy efficiency and acceptable compressor cost. In desalination, an efficient high-volume compressor when used in a vapor-compression distillation system would lower the cost of desalted water. The sought high volumes would more than triple the highest current (1500 t/d) single-effect unit-size capacity which in turn helps reducing initial cost, and the high efficiency reduces running energy expenses.

The invention is a single-stage compressor whereby the working fluid enters radially inwards and leaves axially. The stage is made up of two peripheral rings of blades. The outer rotates and the inner is stationary. The rotating blades of the outer ring are attached to a rotor and are spanned circumferentially in a circle at the periphery of the compressor with their length parallel to the axis of rotation. The stationary blades (also called diffuser blades) are attached to a stator and are spanned circumferentially in an inner concentric circle. The difference in the radii of the two circles is slightly larger than the width of the blades.

The volumetric flow rate of the compressed fluid decides the smallest possible inner radius giving rise to two design options. These are an outer radius nearest to the minimum inner radius and long blades or large radii and short blades. Both options can provide ample flow area to accomodate a large volumetric flow. The design radial flow velocity decides the radii and the length of blades for either option.

All blades have airfoil profile of predetermined inlet and exit blade angles and are supported by rings at both ends. Additional intermediate strengthening rings may be used to sustain bending stresses in which case the blades may or may not be segmented between the rings.

Inlet guide vanes precede the rotating blades, if it is desired to direct the incoming stream with appropriate angles to the rotating blades for higher efficiency. The vanes may be fixed separately or fixed to the stator. Another set of guide vanes (surfaces of revolution), fixed separately or fixed to the stator, are placed after the diffuser blades to guide the compressed vapor from radial to axial direction. The number of rotating blades and diffuser blades and their inlet and exit angles are selected to provide a low diffusion factor for high efficiency. The speed of the rotating blade is limited by the allowable bending stress of the blades material and the tensile strength of the rings material. Vapor speeds are limited by sonic speeds. Within safe margins of these limits high speeds are preferable. Speeds around sonic speeds may be used with suitably profiled airfoil blades.

An important aspect of the invention is the neat integration of the above described compressor with the evaporator-condenser of a vapor-compression system with simple ductwork. The current practice, at the large end of the scale of the current unit-size, use centrifugal compressors involving bulky ductwork.

Another aspect is that more than one compression stage can be used to extend the pressure ratio from 1.5 to 2 if needed. In this case the rotor may carry and drive two or three rings of rotating blades and the stator carries the same number of rings. All rings are concentric and are arranged as pairs of rotating and stationary blades to compress the vapor in stages.

BRIEF DESCRIPTION OF THE DRAWINGS

FIG. 1 is an elevation and a plan of the preferred first embodiment.

FIG. 2 is a preferred second embodiment showing the vapor-compression distillation unit which integrates the compressor of the first embodiment and a vertical spray-type evaporator-condenser.

Figure 3A:
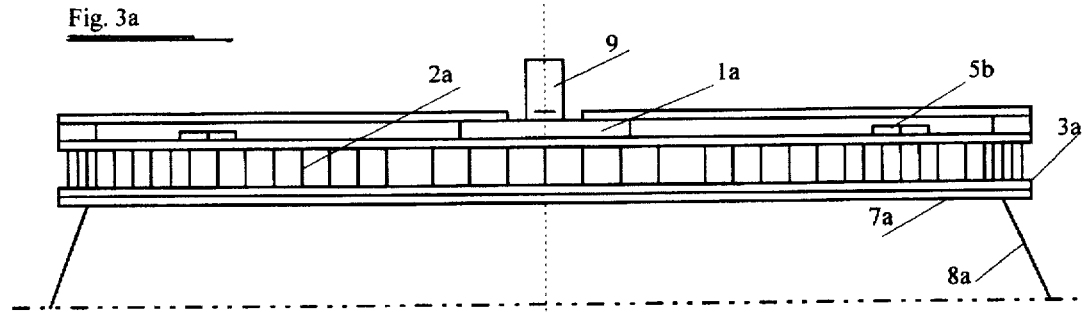
FIG. 3 shows an alternative of the first embodiment when larger radius and shorter blades are preferred. Both the rotor and the stator are segmented radially.

Table 1 shows one possible set of design characteristics of the second embodiment for a vapor-compression distillation unit of capacity 10000 t/d (2.5 mgd).

DESCRIPTION OF THE PREFERRED EMBODIMENTS

FIG. 1 shows the first embodiment of the invention. A single-stage radial-inflow turbo-compressor comprising a rotor 1 with one set of rotating blades 2 at the periphery of the rotor situated parallel to the axis of rotation and a stator 3 of one set of stationary blades 4 inwardly next to the rotating blades. The two sets are concentric. Supporting rings 5 as integral parts of each set of blades are placed at both ends of the blades, and if necessary in between, to sustain the bending stress arising from the centrifugal forces. The intermediate strengthening rings also help even distribution of the flow rate along the length of the blades and in the axial direction. The blades are airfoils of predetermined inlet and exit blade angles based on fluid angles of the inlet and exit velocity triangles shown on FIG. 4. Inlet guide vanes 6 precede the rotating blades to direct the vapor to be compressed to the rotor blade inlet angle. This permits a larger radial flow velocity while keeping all velocities subsonic. It also permits 50% reaction blading with half the temperature rise is obtained by the rotating blades and half by the diffuser blades. A pressure rise corresponding to a raise in the vapor saturation temperature of up to 10° F. happened to be achieved with diffusion factor less than 0.5. Low diffusion factor and 50% reaction blading translate to high efficiency (lower fluid dynamic losses). The radial velocity is kept constant by adjusting the length of both the rotating blades 2 and the diffuser blades blades 4 in the radial direction to compensate for the opposing effects of increased vapor density and reduced flow area radially inwards. The surfaces of revolution 7 are fixed surfaces which change the direction of the compressed vapor from radial to axial. A diffuser duct 8 of small divergence angle ultimately reduces the velocity of the compressed vapor from its assigned radial value to an exit value around 300 ft/s. The compressor may be driven by an electric motor or by a diesel engine via driving shaft 9.

FIG. 2 is a second embodiment showing the integration of the compressor of the first embodiment in a vapor-compression distillation system. The system comprises the compressor of embodiment 1, an enveloping structure 11, a diffuser 10, a heat exchange surface 12 (evaporator-condenser), heat recovery exchangers 21, and a set of service pumps 22. The heat exchange surface 12 is one or more bundles of vertical tubes. The diffuser 10 is a diverging duct of relatively larger angle and is installed between diffuser 8 and the inlet to the tubes 12 inside which the compressed vapor condenses, in order to lower the approach velocity of the vapor to about 100 ft/s. Spraying means 13 equipped with spraying nozzles 14 spray the liquid to be evaporated evenly on the outside of the tubes by pump 18. The released vapor enters the compressor after passing through demisters 15. The condensed vapor (distillate) is connected to the distillate pump 20. Non-condensable gases are connected to vacuum pump 19. The feed enters via pump 16 and the rejected brine via pump 17. The feed, distillate and rejected brine exchange heat via the recovery exchangers 21. The set of pumps and the recovery exchangers are essential to the operation of any vapor compression distillation system operating above or below ambient temperature.

The evaporator-condenser in this embodiment contrasts the well-known horizontal spray evaporator in two respects. These are lower vapor-pressure loss and higher heat transfer coefficients. The first is due to the straight and relatively short connection between the compressor exit and the inlet to the heat exchange tubes. The second is due to the more efficient gravity drainage of the condensate and the better collection of the non-condensable gases.

Figure 3B:
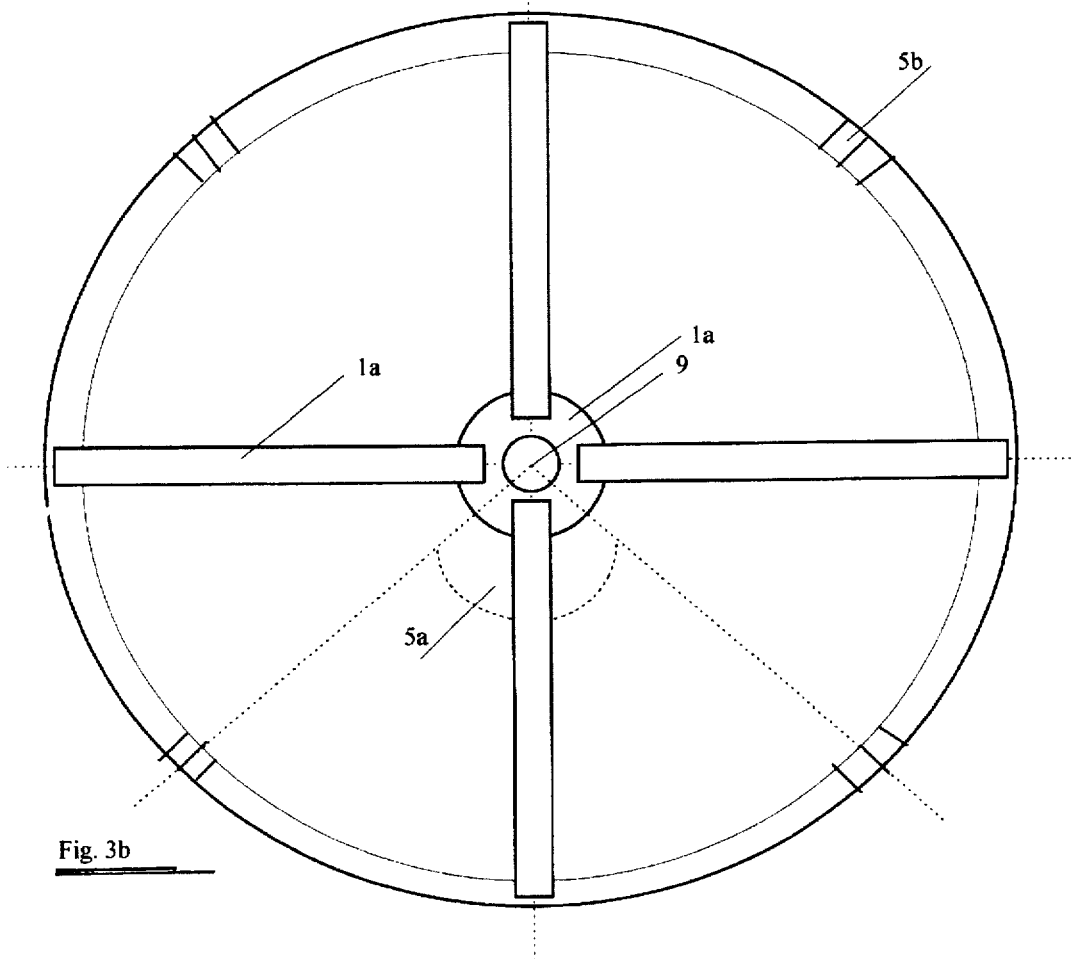

FIG. 3 is an alternative embodiment of the compressor of the preferred embodiment 1. For the same tip speed increasing the rotor diameter results in a compressor of a slower rotational speed and shorter blades with no intermediate strengthening rings. Diffusion is shared by the surfaces of revolution 7a and diffuser 8a. This results in a system of less height. However, because of the large radius of rotation, the rotor 1a and the stator 3a are now made of circumferential segments. FIG. 3 shows the segmented rotor 1a with snort blades supported and strengthened by end rings only made of segments 5a. All segments are fastened together by fasteners 5b to create continous rings.

The technical arguments supporting the preferred embodiments 1 and 2 is portrayed by FIG. 4, FIG. 5, and table 1.

FIG. 4 discusses the forces and energies of a fluid element from inlet to exit of the compressor of embodiment 1.

Figure 4A:
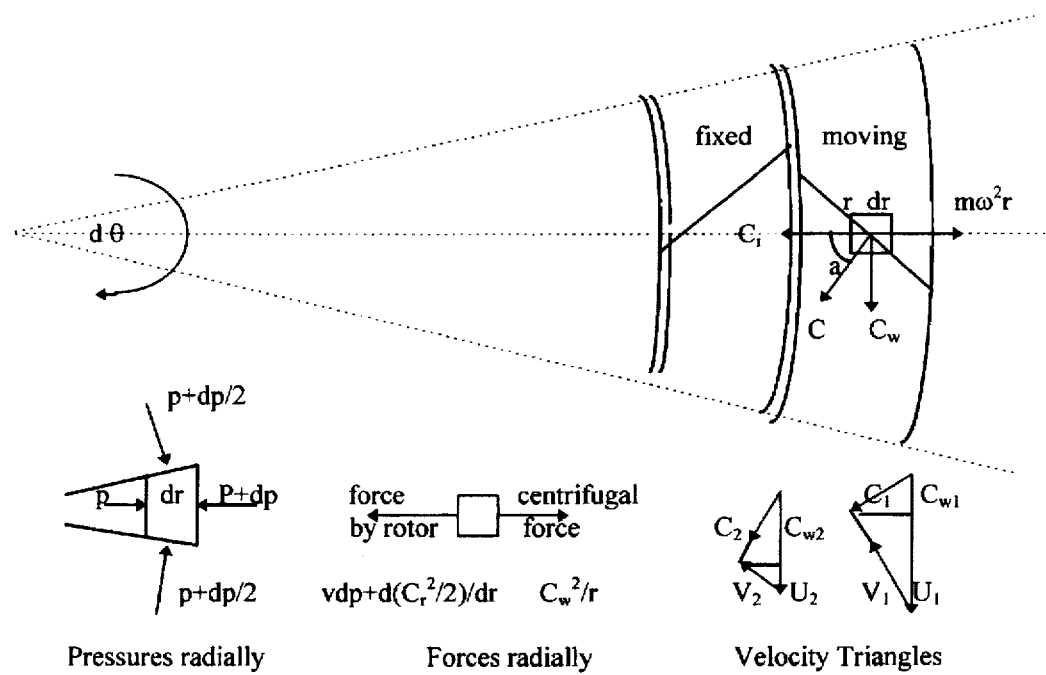
FIG. 4 shows the forces, pressures, and velocities of a fluid element to quantify, in a radial direction, the influence of the outward centrifugal force in relation to the inward forces by the rotor. The figure shows also the overall changes of velocities and pressures over the rotor and stator blades.
Figure 4C:
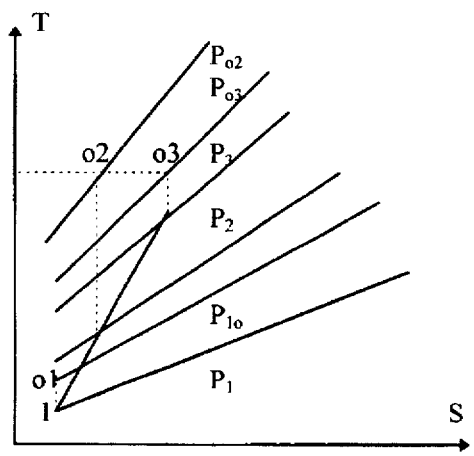
Figure 4B:
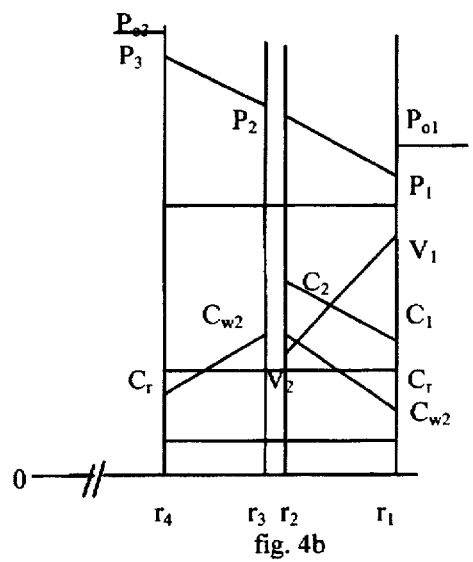

The forces and velocities of a fluid element assuming 2-dimensional flow are shown in FIG. 4a. The changes in pressure and velocities across rotor and diffuser blades are shown in FIG. 4b. FIG. 4c show the thermodynamic states of one stage on the conventional T-S diagram.

Over a moving blade in a radial direction, the centrifugal force on a fluid element $C_w^2/r$ opposes the flow as shown in FIG. 4a. This force would either increase the pressure acting on the blades or reduce the kinetic energy inwards while trying to produce a motion outwards. In certain locations, the force may also divide its influence on both possibilities. Considering the two possibilities as mutually exclusive, the force balance equations are given by:

$$C_w^2/r = v\, dp/dr \tag{1}$$

or $$C_w^2/r = d(C_r^2/2)/dr \tag{2}$$

Integrating from inlet to exit of a rotating blade, equation (1) gives the increase in pressure and equation (2) gives the decrease in kinetic energy. The values obtained decide whether the influence of the centrifugal force is primary or secondary. For high rotational speeds (small radii of rotation of ratio <0.5), the values may be significant. For low rotational speeds (large radii of ratio >0.8), the values are insignificant.

Assuming a mean specific volume vm for the case of low pressure differentials, equations (1,2) may be written as:

$$\Delta p = 1/vm \int_{r2}^{r1} C_w^2/r\, dr \tag{3}$$

$$\Delta C_r^2/2 = \int_{r2}^{r1} C_w^2/r\, dr \tag{4}$$

Considering for example, a design characterized by $r_1=5.8$ ft, $r_2=4.7$ ft, tip speed 1000 ft/s, whirl components $C_{w1}$ and $C_{w2}$ 0.15 and 0.75 tip speed respectively, pressure differential 0.6 psi, mean specific volume 200 ft$^3$/lb, and radial velocity 800 ft/s. Equations (3,4) assuming $C_w$ to vary linearly with radius, give changes of less than 3%. This means that serious flow separation due to unguarded rise of pressure or deceleration of fluid velocity by the centrifugal forces is unlikely and that slight modification of the inlet angle to the diffuser blades and slight modification of the flow passage after the diffuser blades and before the flow aquires an axial velocity component may help avoiding penalized efficiency though an efficiency penalty of 1.5% has been introduced in the computations.

Energy changes are now addressed by considering the energy relations:

stagnation enthalpy $h_o = h + C^2/2$

Then the change of the stagnation enthalpy radially is $$dh_o/dr = dh/dr + C^*dC/dr \tag{5}$$

$= dh/dr + C_w^*dC_w/dr$ for constant radial velocity $dh/dr = T^*ds/dr + v^*dp/dr$ $$dh_o/dr = T^*ds/dr + v^*dp/dr + C^*dC/dr \tag{6}$$

$dh_o/dr - T^*ds/dr = v^*dp/dr + C^*dC/dr$ $dh_o/dr - T^*ds/dr$ is approximately the isentropic stagnation $dh_{os}/dr$ $$dh_o/dr*\eta = v*dp/dr + C*dC/dr \quad (7)$$

Integrating from $r_1$ to $r_2$ over a rotating blade assuming constant efficiency $\eta$ and an average specific volume vm $$(h_{o2}-h_{o1})*\eta = vm*(p_2-p_1) + (C_2^2-C_1^2)/2 \quad (8)$$

$h_{o2}-h_{o1}$ is the work done w on the vapor by the rotating blades and is in the same time $U_2*C_{w2}-U_1*C_{w1}$ where $U_2$ and $U_1$ are the blade speeds. Note that $U_2$ is slightly less than $U_1$. The work raises the pressure and increases the velocity. i.e.

$$h_{o2}-h_{o1} = w = 1/\eta*(vm*(p_2-p_1) + (C_2^2-C_1^2)/2) \quad (9)$$

50% reaction blading is the case of equal terms.

Integrating equation (4) from r3 to r4 over a diffuser blade using the notations 2 and 3 at r3 and r4 respectively $$(h_{o3}-h_{o2})*\eta = vm*(p_3-p_2) + (C_3^2-C_2^2)/2 \quad (10)$$

$h_{o3}=h_{o2}$ since no work is done by a fixed blade. Setting $C_3=C_1$ then $$vm*(p_3-p_2) = (C_2^2-C_1^2)/2 \quad (11)$$

The increase of pressure is at the expense of decreasing kinetic energy.

Figure 5A:
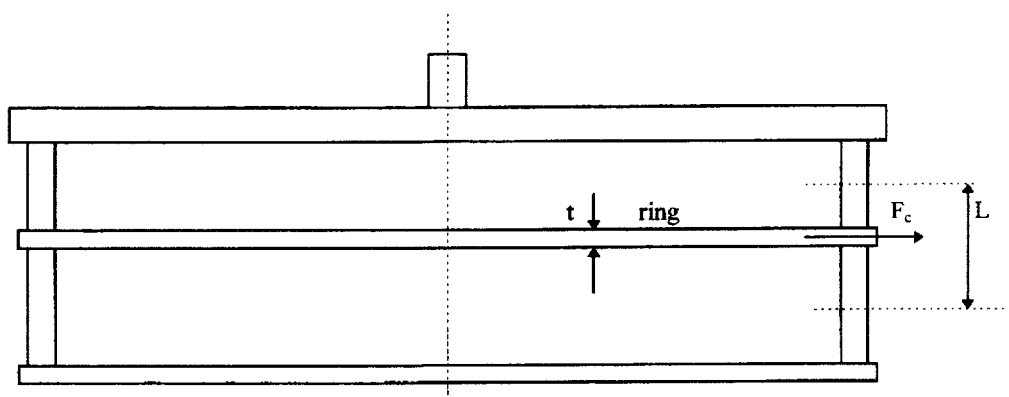
FIG. 5 show the forces causing critical stresses in the rotor assembly.
Figure 5B:
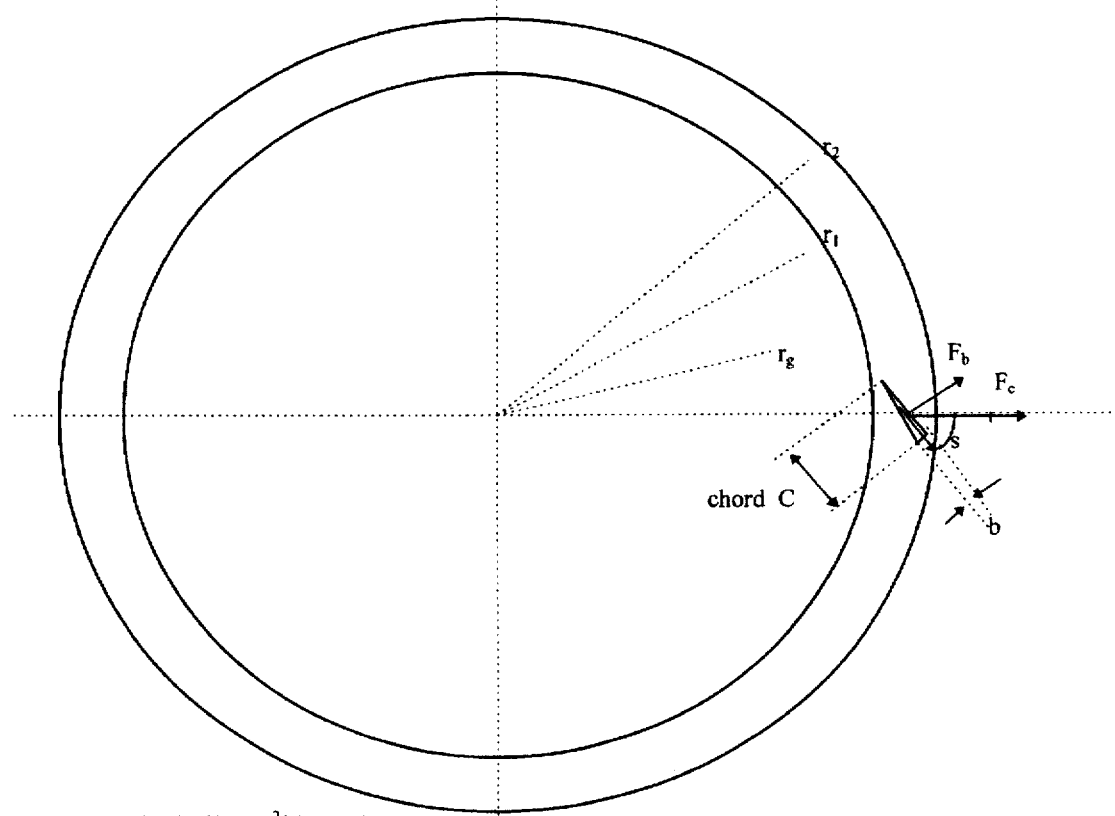

FIG. 5 shows the locations of 2 critical stresses: the tensile stress in supporting rings (FIG. 5a) and the bending stress at midspan a supported blade (FIG. 5b). They are provisionally evaluated assuming materials of steels, density 490 lb/ft$^3$, allowable tensile stress 145000 psi and allowable bending stress 35000 psi.

The following equations are used:

a) Tensile stress of a ring inner radius $r_1$ and outer $r_2$:

$$m_r = \rho_r*\Pi*(r_2^2-r_1^2)*t \quad (12)$$

$$m_b = \rho_b*n_b*L*C*b/2 \quad (13)$$

$$r_g = (4/3*\Pi)*(r_2^3-r_1^3)/(r_2^2-r_1^2) \quad (14)$$

$$F_c = (m_r+m_b)/2*\omega^2*r_g \quad (15)$$

$$A = 2*(r_2-r_1)*t*f \quad (16)$$

$$\sigma_t = F_c/A \quad (17)$$

$m_r$, $m_b$ are the masses of ring and supported blades
$r_g$ is radius of center of gravity of half ring
$F_c$ is the stressing centrifugal force
f is a bond factor of blade to ring assumed 0.875
$\omega$ is rotational speed rad/s
$\sigma_t$ is the tensile stress b) Bending stress appproximating blade section to a triangle:

$$F_c = \rho_b*(L*C*b/2)*\omega^2*(r_2+r_1)/2 \quad (18)$$

$$M = F_c* \sin (s)*L/24 \quad (19)$$

$$Z = b^2*C/24 \quad (20)$$

$$\sigma_b = M/Z \quad (21)$$

$F_c$ is the centrifugal force of a supported blade length
b is the maximum thickness of the blade
C is the chord of the blade, b/C assumed 0.1
L is the length of the blade between two rings
M is the bending moment around chord axis
s is the stagger angle (inclination of chord from radial)
Z is the weaker modulus of section
$\sigma_b$ is the bending stress.

Table 1 lists the design characteristics of a 10000 t/d single-effect vapor compression distillation unit given boundary parameters and design assumptions. The boundary pressures and temperatures are selected for minimum scale deposits.

The predicted performance of the compressor at design conditions is based of results of cascade tests on axial compressors covering the assumed blade profile for zero angle of incidence. The obtained efficiency by the cascade performance data is penalized by 1.5% since the adverse effect of centrifugal forces is different from their adverse effect in axial compressors which in axial compressors resulted in the use of twisted blades as a correcting measure.

It may be noted that trying to save on the number of blades by reducing the solidity to 1 instead of 1.92, the efficiency fell to 0.82 (power increased to 7.4 MW), and the diffusion factor increasedd to 0.58.

The predicted surface of the evaporator-condenser under the temperature difference of 10° F. between condensation and evaporation supplied by the compressor is $0.23*10^6$ sq. ft. Smaller surface is expected if the removal of the non-condensables proves to be more efficient than that in the horizontal spray evaporator.

Comparison with a conventional multi-stage flash evaporator MSF of performance 85 Btu/lb product (Flashing range 212°-100° F., 19 recovery stages, 3 rejection stages, condenser terminal 5° F., brine flow per unit width 135 lb/ft s) show the following:

|  | MSF | Single Stage VC |
|---|---|---|
| performance thermal Btu/lb | 85 | 66 (22 work Btu/lb) |
| heat exchange surface 1000 ft$^2$ | 400 | 230 |
| floor area ft$^2$ | 4300 | 1260 |
| volume space 1000 ft$^3$ | 86 | 50 |

TABLE 1

Design characteristics of a 10000 t/d single-effect vapor compression distillation unit.

i) Boundary Parameters

| | |
|---|---|
| mass rate | = 290 lb/s. |
| inlet stagnation pressure | = 1.693 psia, |
| inlet temperature | = 120 F. |
| exit stagnation pressure | = 2.295 psia |
| condensing temperature at exit | = 131° F. | ii) Design Assumptions

| | |
|---|---|
| tip speed | = 1000 ft/s |
| radial vapor velocity effective | = 800 ft/s |
| efficiency reduction factor | = .985 |
| supported blade length/chord ratio | = 1.7 |
| clearance/chord ratio | = .05 |
| ring width/chord ratio | = 1 |
| blade profile = a NACA series profile for axial compressors | |
| materials suitable steels | |
| circular or square diffusers | |
| approach velocity to heat exchange tubes | = 75 ft/s |
| overall heat transfer coefficitient | = 500 Btu/hr ft2 F |

TABLE 1-continued

Design characteristics of a 10000 t/d single-effect vapor compression distillation unit.

| | | |
|---|---|---|
| | temperature difference (con'dn-evap) | = 10 F |
| | tubes outside diameter | = 1 inch |
| | tubes pitch/diameter ratio | = 1.5 |
| iii) | Compressor Design Characteristics | |
| | compressor adiabatic efficiency | = .89 |
| | compressor power input | = 6.85 MW |
| | Number of stages | = 1 |
| | rotor inlet radius | = 6.6 ft |
| | rotor exit radius | = 4.6 ft |
| | rotor mean blade length | = 2.03 ft |
| | number of rotor blades = 162 solidity | = 1.92 |
| | diffusion factor | = .455 |
| | supporting rings spans (max) | = 0.69 ft |
| | speed of rotation | = 1428 rpm |
| | highest mac number | = .79 |
| | inlet and exit angles rotor blades | = 47 and 13° |
| | inlet and exit angles diffuser blades | = 10 and 43° |
| | stagger angle rotor blades | = 26° |
| | stagger angle fixed blades | = 30° |
| | diffuser length (12° divergence) | = 8.5 ft |
| | ring tensile stress | = 142000 psi |
| | Blade bending stress | = 29000 psi |
| iv) | Heat Exchange Surface Characteristics | |
| | diffuser length (45°) | = 7.5 ft |
| | Length of tubes | = 20 ft |
| | number of tubes | = 44000 |
| | one bundle header diameter | = 30 ft |
| | shell structure base (circular or square) | = 40 ft |
| | shell structure height | = 40 ft |

What is claimed is:

1. A low pressure-differential large volumetric-rate single-stage vapor-compressor whereby the vapor enters radially inwards and leaves axially comprising:

a rotating body with a driving shaft; a plurality of rotating blades situated at the outer radius of the said rotating body between two supporting rings and parallel to the axis of rotation; stator body with a plurality of stationary blades between two supporting rings and situated inwardly parallel to the axis of rotation next to and concentric with the said rotating blades; stationary means next to and concentric with the said stator blades directing the radially inward flow to the axial exit; a diverging axial duct connected to the said axial exit.

2. The compressor of claim 1 wherein said rotating and stationary blades further comprising intermediate strenghening rings.

3. The compressor of claim 1, further comprises inlet guide vanes preceding the said rotating blades.

4. A modified single-effect vapor-compression distillation system comprising:

an enveloping structure; a rotating body receiving a stream of water vapor within said enveloping structure; said rotating body driven by means from outside the said structure through a vertical driving shaft; a plurality of rotating blades within the said structure situated vertically at the outer radius of the said rotating body between two supporting rings which imparts energy to water-vapor moving radially inwards within enveloping structure; stator body with stationary vertical blades situated inwardly next to and concentric with the said rotating blades and between two supporting rings recover the vapor kinetic energy; stationary means next to and concentric with the said stationary blades directing the vapor flow vertically downwards to the inlet of a vertical diverging duct which further recovers kinetic energy; an evaporator-condenser of vertical tubes connected to the said diverging duct exit which condenses the vapor inside the tubes while evaporating brine sprayed by a brine recirculating pump on the outside of the tubes; the released vapor from the said brine moves within the said enveloping structure to the said rotating blades via demisters; a vacuum pump removes the noncondensables from the condenser tubes; a saltwater pump provides seawater feed to said enveloping structure; a brine reject pump dicharges concentrated brine from said enveloping structure and heat recovery exchangers allow the condensed vapor (distillate) and the rejected brine to preheat the saltwater feed.

5. The system of claim 4 wherein said rotating and stationary blades are further strengthened by intermediate rings.

6. The system of claim 4; further comprising inlet guide vanes preceding the rotating blades.

* * * * *